United States Patent
Keller

(10) Patent No.: US 9,229,907 B2
(45) Date of Patent: Jan. 5, 2016

(54) SYSTEM, METHOD, AND COMPUTER PROGRAM PRODUCT FOR EVALUATING AN INTEGRAL UTILIZING A LOW DISCREPANCY SEQUENCE

(71) Applicant: NVIDIA Corporation, Santa Clara, CA (US)

(72) Inventor: Alexander Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 515 days.

(21) Appl. No.: 13/666,888

(22) Filed: Nov. 1, 2012

(65) Prior Publication Data

US 2014/0122548 A1    May 1, 2014

(51) Int. Cl.
G06F 17/10     (2006.01)
G06T 15/50     (2011.01)

(52) U.S. Cl.
CPC ............... *G06F 17/10* (2013.01); *G06T 15/50* (2013.01)

(58) Field of Classification Search
None
See application file for complete search history.

(56) References Cited

U.S. PATENT DOCUMENTS 6,529,193 B1 *  3/2003  Herken et al. ............... 345/426

OTHER PUBLICATIONS

Grunschloss, L. et al., "Enumerating Quasi-Monte Carlo Point Sequences in Elementary Intervals," 2009, pp. 1-10.
Hickernell, F. et al., "Extensible Lattice Sequences for Quasi-Monte Carlo Quadrature," SIAM Journal on Scientific Computing, 2001, vol. 22, pp. 1117-1138.
Keller, A., "Myths of Computer Graphics," Springer, 2006, pp. 217-243.
Niederreiter, H., "Random Number Generation and Quasi-Monte Carlo Methods," Society for Industrial and Applied Mathematics, 1992, pp. 1-241.
Niederreiter, H., "Error bounds for quasi-Monte Carlo integration with uniform point sets," Journal of Computational and Applied Mathematics, 2003, 150, pp. 283-292.
Sobol, I. M., "On the Distribution of Points in a Cube and the Approximate Evaluation of Integrals," Zh. vychisl. Mat. mat. Fiz., 1967, vol. 7, No. 4, pp. 784-802.
Sobol, I. M., "Uniformly Distributed Sequences with an Additional Uniform Property," 1976, pp. 236-241.

* cited by examiner

Primary Examiner — Said Broome
(74) Attorney, Agent, or Firm — Zilka-Kotab, PC

(57) ABSTRACT

A system, method, and computer program product are provided for evaluating an integral utilizing a low discrepancy sequence. In use, a low discrepancy sequence that includes at least one component that is a (0,1)-sequence in base b is determined. Additionally, an integral is evaluated, utilizing the low discrepancy sequence.

20 Claims, 4 Drawing Sheets

SYSTEM, METHOD, AND COMPUTER PROGRAM PRODUCT FOR EVALUATING AN INTEGRAL UTILIZING A LOW DISCREPANCY SEQUENCE

FIELD OF THE INVENTION

The present invention relates to rendering images, and more particularly to performing light transport simulation.

BACKGROUND

Traditionally, light transport simulation has been used to enhance a visual realism of generated images. For example, light transport simulation may be used to generate realistic images by tracing paths of light through the pixels of the image plane. However, current techniques for performing light transport simulation have been associated with various limitations.

For example, current methods for performing general motion blur simulation in the context of light transport simulation may be costly and inefficient. Alternately, approximations may need to be used to increase efficiency, but such approximations may not be feasible for simulation of non-linear motion. There is thus a need for addressing these and/or other issues associated with the prior art.

SUMMARY

A system, method, and computer program product are provided for evaluating an integral utilizing a low discrepancy sequence. In use, a low discrepancy sequence that includes at least one component that is a (0,1)-sequence in base b is determined. Additionally, an integral is evaluated, utilizing the low discrepancy sequence.

DETAILED DESCRIPTION

Figure 1:
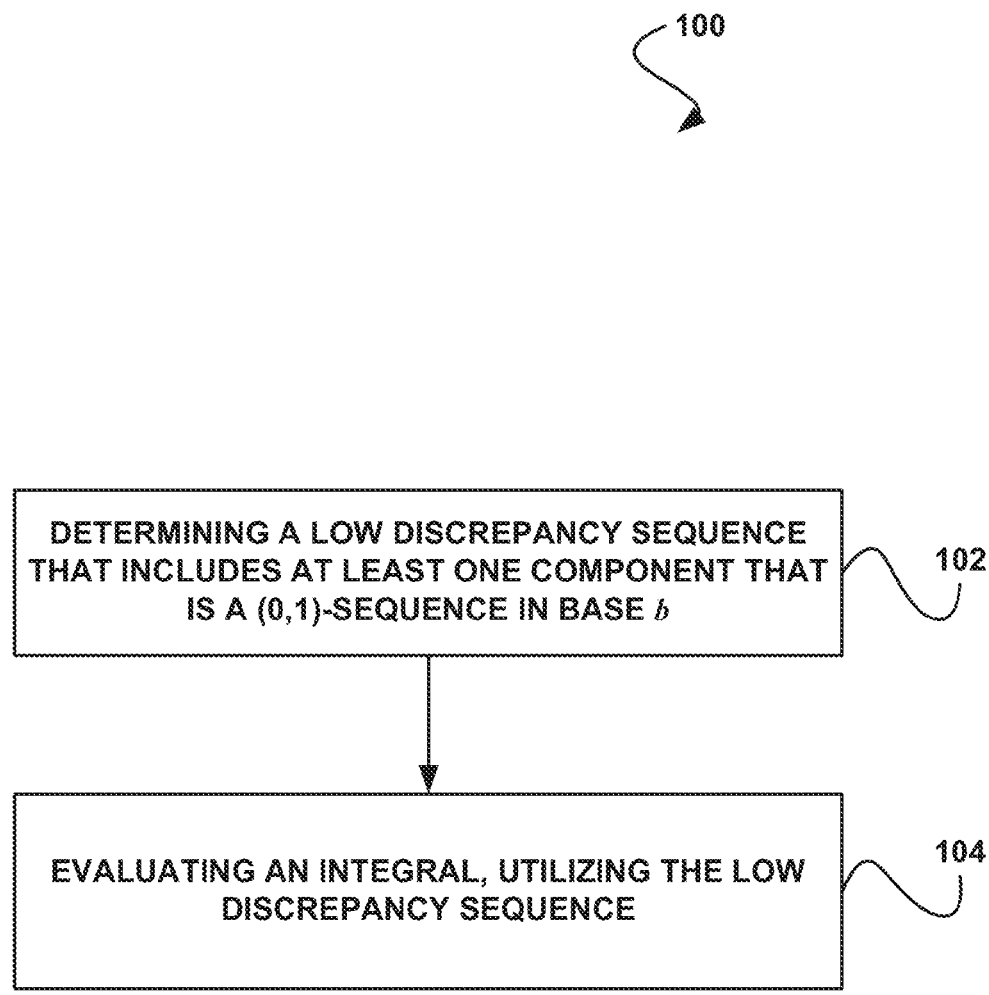
FIG. 1 shows a method for evaluating an integral utilizing a low discrepancy sequence, in accordance with one embodiment.

FIG. 1 shows a method 100 for evaluating an integral utilizing a low discrepancy sequence, in accordance with one embodiment. As shown in operation 102, a low discrepancy sequence that includes at least one component that is a (0,1)-sequence in base b is determined. In one embodiment, the low discrepancy sequence may include a plurality of vectors. For example, the low discrepancy sequence may include a sequence of vectors with a low discrepancy. In another embodiment, the low discrepancy sequence may include a sequence $(x_i, y_i)$, where $x_i$ represents dimensions of a sink path segment, and $y_i$ represents dimensions of a source path segment. In yet another embodiment, the (0,1)-sequence in base b may be generated utilizing an upper triangular matrix.

Furthermore, in one embodiment, the properties of (t,s)-sequences in base b, including (0,1)-sequences, may be imposed by a predetermined definition. Table 1 illustrates an exemplary definition for use in the invention. Of course, it should be noted that the definition shown in Table 1 is set forth for illustrative purposes only, and thus should not be construed as limiting in any manner.

TABLE 1

For a fixed dimension $s \geq 1$ and an integer base $b \geq 2$ the subinterval $$E(p_1, \ldots, p_s) := \prod_{j=1}^{s} [p_j \cdot b^{-d_j}, (p_j + 1) \cdot b^{-d_j}) \subseteq [0, 1)^s$$

with $0 \leq p_j < b^{d_j}$, $p_j, d_j \in \mathbb{N}_0$, is called an elementary interval. For integers $0 \leq t \leq m$, a (t,m,s)-net in base b is a point set of $b^m$ points in $[0,1)^s$ such that there are exactly $b^t$ points in each elementary interval $E(p_1, \ldots, p_s)$ with volume $b^{t-m}$. For an integer $t \geq 0$, a sequence $x_0, x_1, \ldots$ of points in $[0, 1)^s$ is a (t,s)-sequence in base b if, for all integers $k \geq 0$ and $m > t$, the point set $x_{kb^m}, \ldots, x_{(k+1)b^m-1}$ is a (t,m,s)-net in base b.

Additionally, in one embodiment, the low discrepancy sequence may include a (t,s)-sequence in base b. In another embodiment, the low discrepancy sequence may include a rank-1 lattice sequence. In yet another embodiment, the low discrepancy sequence may include a Halton sequence. In still another embodiment, the low discrepancy sequence may include a hybrid sequence. See, for example, "Quasi-Monte Carlo Image Synthesis in a Nutshell" (A. Keller), which describes hybrid sequences and is hereby incorporated by reference in its entirety. Of course, however, the low discrepancy sequence may include any sequence of vectors with a low discrepancy.

Further, as shown in operation 104, an integral is evaluated, utilizing the low discrepancy sequence. In one embodiment, evaluating the integral may include enumerating the low discrepancy sequence to create a plurality of points in the low discrepancy sequence. In another embodiment, enumerating the low discrepancy sequence may include enumerating the at least one (0,1)-sequence in base b by a factor of a power of b that is slower than at least one of the components of the low discrepancy sequence other than that (0,1)-sequence in base b. In yet another embodiment, the integral may be evaluated utilizing the plurality of points created by enumerating the low discrepancy sequence.

Further still, in one embodiment, the low discrepancy sequence may be used in association with a measurement contribution algorithm. In another embodiment, the low discrepancy sequence and the measurement contribution algorithm may be used to determine a measurement of light transport. In another embodiment, the low discrepancy sequence and the measurement contribution algorithm may be used to perform a motion blur simulation when determining the measurement of light transport.

Also, in one embodiment, multiple components of the low discrepancy sequence may be (0,1)-sequences in base b. In another embodiment, each one of the multiple components may be enumerated by a factor of a power of b that is slower than at least one of the other components of the low discrepancy sequence. In this way, integro-approximation may be performed, utilizing the low discrepancy sequence.

In addition, in one embodiment, the at least one component that is a (0,1)-sequence in base b may be used to compute motion blur in image synthesis. For example, the at least one component that is a (0,1)-sequence in base b may be used to compute motion blur in image synthesis using motion segments. In another embodiment, the at least one component that is a (0,1)-sequence in base b may be used to perform spectral simulation by selecting a wave length. In yet another embodiment, the at least one component that is a (0,1)-sequence in base b may be used to simulate path termination using a Russian Roulette methodology. In still another embodiment, the at least one component that is a (0,1)-sequence in base b may be used to select and sample light sources for illumination computation.

Furthermore, in one embodiment, evaluating the integral may include determining a measurement contribution resulting from a connection of one or more optical path segments and one or more light source path segments. For example, end points may be determined for each tuple $(x_i, y_i)$, where the end point for $x_i$ may be determined by tracing an optical path from its origin (e.g., a camera, an eye, etc.), and where the end point for $y_i$ may be determined by tracing a photon trajectory from a light source.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
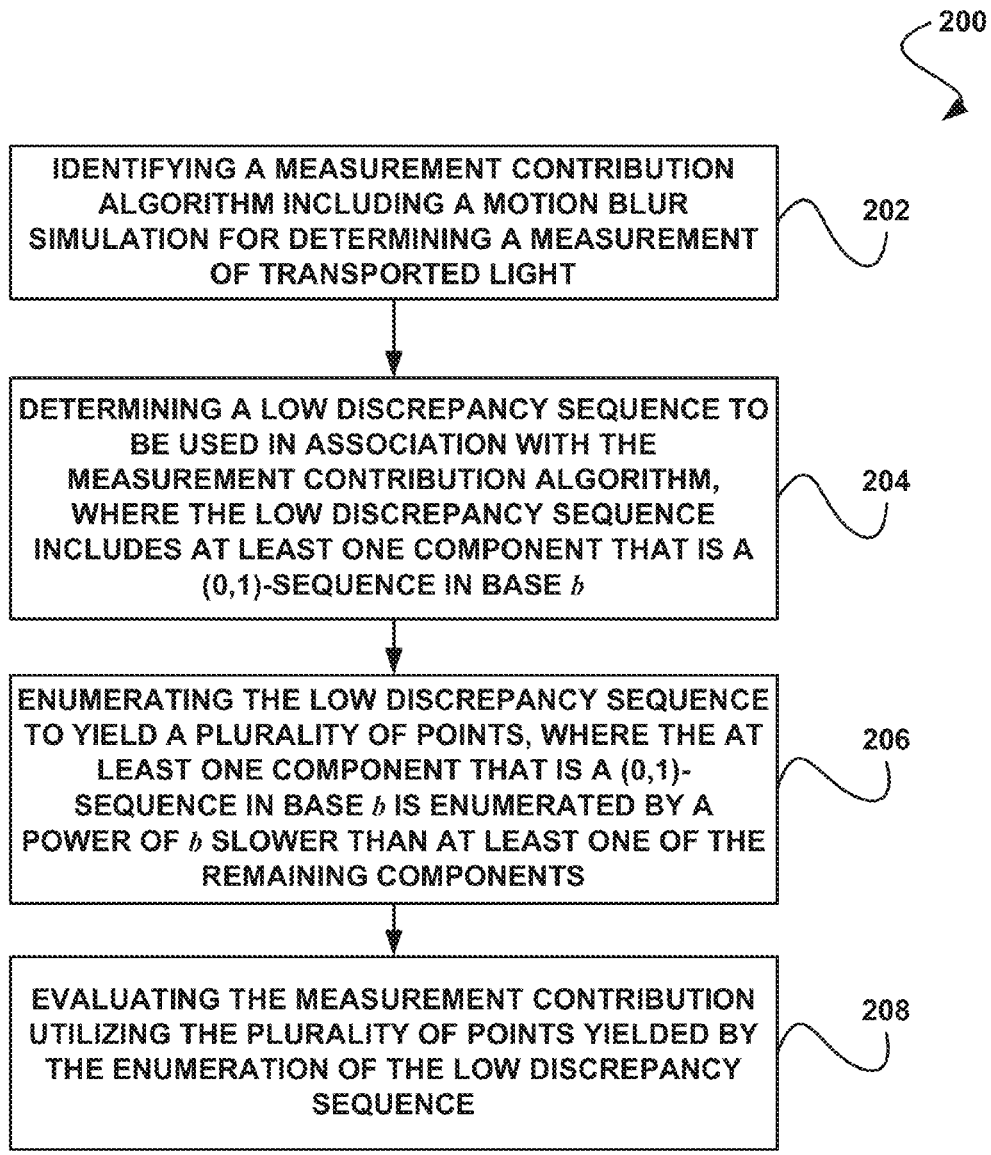
FIG. 2 shows a method for performing light transport simulation using motion blur sampling, in accordance with another embodiment.

FIG. 2 shows a method 200 for performing light transport simulation using motion blur sampling, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a measurement contribution algorithm including a motion blur simulation for determining a measurement of transported light is identified. In one embodiment, image synthesis may include computing functionals of the solution of a Fredholm integral equation of the second kind, which models light transport. Due to high dimensionality and discontinuities of the functions involved, numerical algorithms may average the contribution of transport paths sampled from the space of all possible light transport paths.

Additionally, Monte Carlo methods may generate such samples from random numbers, which on a computer are simulated by pseudo-random number generators. See, for example, "Die Monte-Carlo-Methode," (I. Sobol', Deutscher Verlag der Wissenschaften, 1991), which is hereby incorporated by reference in its entirety. Independence and unpredictability may only be mimicked, because pseudorandom number generators may be implemented as deterministic algorithms.

Further, quasi-Monte Carlo methods may include the deterministic counterpart of Monte Carlo methods. See, for example, "Random Number Generation and Quasi-Monte Carlo Methods," (H. Niederreiter, SIAM, Philadelphia, 1992), which is hereby incorporated by reference in its entirety. They may improve convergence speed as compared to Monte Carlo methods, because omitting the simulation of independence and unpredictability may allow for improved sampling. In addition, quasi-Monte Carlo methods may have the desirable properties of simple parallelization and strict reproducibility. See, for example, "Parallel Quasi-Monte Carlo Integration by Partitioning Low Discrepancy Sequences," (A. Keller and L. Grünschloβ, *Monte Carlo and Quasi-Monte Carlo Methods* 2010, 2012, pages 467-478), and "Enumerating quasi-Monte Carlo point sequences in elementary intervals," (Grünschloβ et al., *Monte Carlo and Quasi-Monte Carlo Methods* 2010, 2012, 1992, pages 379-388), which are hereby incorporated by reference in their entirety.

Further still, in one embodiment, light transport simulation may be reduced to integro-approximation problem. In another embodiment, error bounds may be introduced for quasi-Monte Carlo integration with uniform point sets that allow for error bounds on $L_2$. See, for example, "Error bounds for quasi-Monte Carlo integration with uniform point sets," (H. Niederreiter, J. Comput. Appl. Math., 150 (2003), 283-292), which is hereby incorporated by reference in its entirety. These results may also be generalized for integro-approximation. See, for example, "Myths of computer graphics," (A. Keller, Monte Carlo and Quasi-Monte Carlo Methods 2004 (H. Neiderreiter, ed.), Springer, 2006, 217-243), which is hereby incorporated by reference in its entirety. These theorems may rely on point sequences that are $(M, \mu)$-uniform. One example of such point sequences are (t, s)-sequences, which in turn often are generated by digital radical inverses. See, for example, "Random Number Generation and Quasi-Monte Carlo Methods," (H. Niederreiter, SIAM, Philadelphia, 1992), which is hereby incorporated by reference in its entirety.

Table 2 illustrates exemplary digital radical inverses in base b, in accordance with one embodiment. Of course, it should be noted that the exemplary digital radical inverses shown in Table 2 are set forth for illustrative purposes only, and thus should not be construed as limiting in any manner.

TABLE 2

$$\phi : \mathbb{N}_0 \to \mathbb{Q} \cap [0, 1)$$

$$i \mapsto (b^{-1} \ldots b^{-M}) \left[ C \begin{pmatrix} a_0(i) \\ \vdots \\ a_{M-1}(i) \end{pmatrix} \right]$$

In one embodiment, digital radical inverses in base b may be computed using a generator matrix C, where the inverse mapping $\phi_{b,C}^{-1}$ may exist, if C is regular. While in theory these matrices may be infinite-dimensional, in practice they may be finite due to the finite precision of computer arithmetic. M may include the number of digits, which may allow for generating up to $N=b^M$ points. In another embodiment, the matrix-vector multiplications may be performed in the finite field $F_b$.

Also, in one embodiment, sampling may be based on the Sobol' sequence, which may be a (t, s)-sequence in base b=2. See, for example, "On the Distribution of points in a cube and the approximate evaluation of integrals," (I. Sobol, Zh. Vychisl. Mat. Mat. Fiz. 7, 1967, no. 4, 784-802), and "Uniformly Distributed Sequences with an additional Uniform Property," (Zh. Vychisl. Mat. Mat. Fiz. 16, 1976, no. 5, 1332-1337), which are hereby incorporated by reference in their entirety. In another embodiment, each point of the Sobol' sequence may determine a light transport path, where the first two components may be used to map to a pixel, and further components may determine the remainder of the path.

In addition, in one embodiment, motion blur may be simulated by sampling the time t using one of the components of the Sobol' sequence to integrate over the shutter interval. In another embodiment, all components of the Sobol' sequence may be (0, 1)-sequences, and there may never be repetitions in the numbers enumerated for one component. This may require the scene asset to be adjusted according to each single sample in time.

As a result, an algorithm may be derived where an instant in time may be shared across multiple light transport paths. As a consequence, efficiency may remain high and image quality may be improved at the same time, as approximations may no longer be required to improve efficiency.

Table 3 illustrates an algorithm for a quasi-Monte Carlo integration where one dimension is sampled at a rate $b^m$ less than others, in accordance with one embodiment. Of course, it should be noted that the exemplary algorithm shown in Table 3 is set forth for illustrative purposes only, and thus should not be construed as limiting in any manner.

TABLE 3

Given an s-dimensional ($\mathcal{M}$, μ)-uniform point sequence ($x_i$, $t_i$), where the component $t_i$ is a (0,1)-sequence generated by an upper triangular matrix, $$\lim_{n \to \infty} \frac{1}{n} \sum_{i=0}^{n-1} f(\vec{x}_i, t_{\lfloor i/b^m \rfloor}) = \int_{[0,1)^s} f(\vec{x}, t) dt dx.$$

Figure 3:
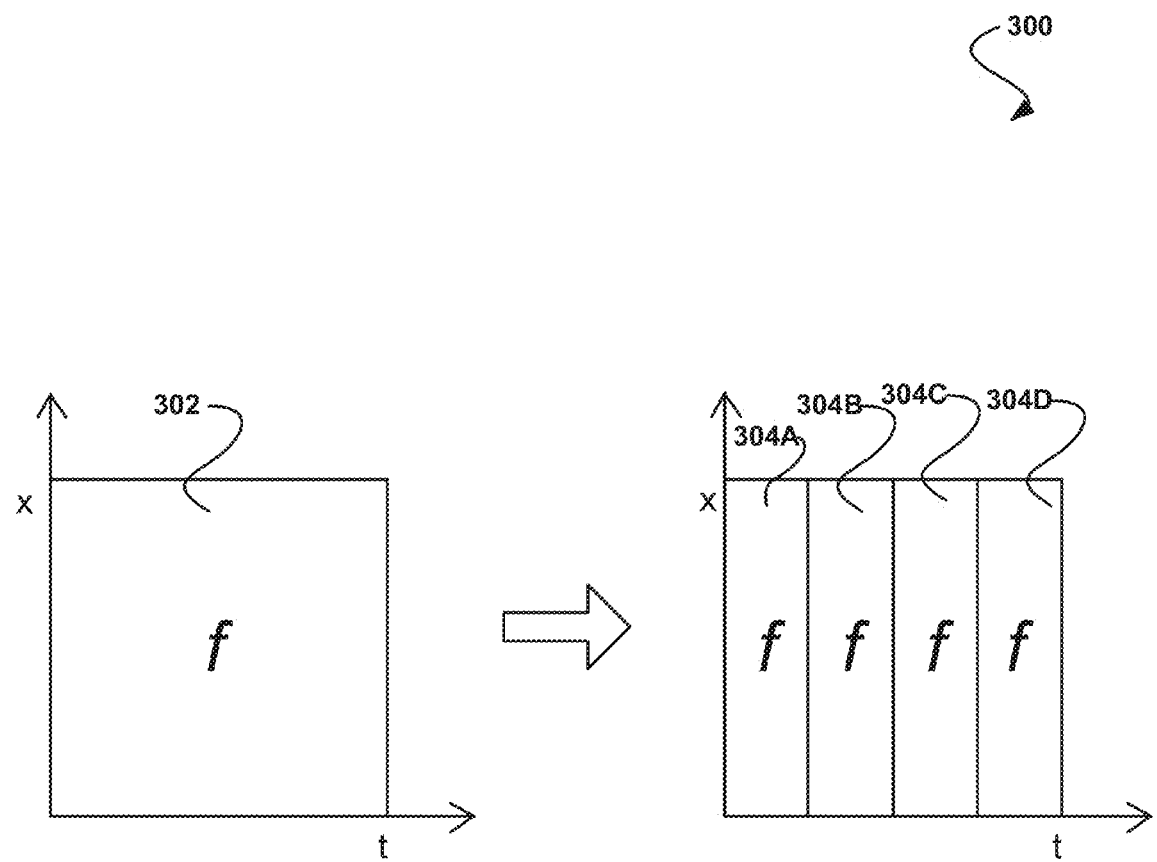
FIG. 3 shows an exemplary rewriting of an integral, in accordance with another embodiment.

In one embodiment, the implementation may include shifting the index i to the right by m digits in base b. In another embodiment, the above algorithm may be proofed. For example, the integral of f may be rewritten as an integral of $b^m$ copies of f with respect to the dimension t. FIG. 3 shows an exemplary rewriting of an integral of f 302 as an integral of four copies of f 304A-D.

Table 4 illustrates a derivation of a quasi-Monte Carlo integration, in accordance with one embodiment. Of course, it should be noted that the exemplary derivation in Table 4 is set forth for illustrative purposes only, and thus should not be construed as limiting in any manner.

TABLE 4

$$\int_{[0,1)^s} f(\vec{x}, t) dt dx = \int_{[0,1)^s} \sum_{j=0}^{b^m-1} \chi_{[\frac{j}{b^m}, \frac{j+1}{b^m})}(t) f(\vec{x}, b^m t - j) dt dx$$

$$= \lim_{n \to \infty} \frac{1}{n} \sum_{i=0}^{n-1} \sum_{j=0}^{b^m-1} \chi_{[\frac{j}{b^m}, \frac{j+1}{b^m})}(t_i) f(\vec{x}_i, b^m t_i - j)$$

$$= \lim_{n \to \infty} \frac{1}{n} \sum_{i=0}^{n-1} \sum_{j=0}^{b^m-1} \chi_{[\frac{j}{b^m}, \frac{j+1}{b^m})}(\Phi(i)) f(\vec{x}_i, b^m \Phi(i) - j)$$

$$= \lim_{n \to \infty} \frac{1}{n} \sum_{i=0}^{n-1} f(\vec{x}_i, \Phi(\lfloor i/b^m \rfloor)) \underbrace{\sum_{j=0}^{b^m-1} \chi_{[\frac{j}{b^m}, \frac{j+1}{b^m})}(\Phi(i))}_{=1}$$

$$= \lim_{n \to \infty} \frac{1}{n} \sum_{i=0}^{n-1} f(\vec{x}_i, t_{\lfloor i/b^m \rfloor})$$

In one embodiment, the characteristic function $\chi_A(t)$ may be one if t∈A and may be zero otherwise. In another embodiment, in the above derivation, the integral may be computed using an (M, μ)-uniform point sequence ($x_i$, $t_i$), where the characteristic function χ may select the summands with $$t_i \in \left[\frac{j}{b^m}, \frac{j+1}{b^m}\right).$$

As a consequence, the index j may coincide with the integer part of $b^m t_i$.

Additionally, in one embodiment, $t_i = \Phi(i)$ may include a (0, 1)-sequence in base b generated by an upper triangular matrix as defined in Table 2. In another embodiment, the in least significant digits of i may only influence the m most significant digits of $\Phi(i)$. Therefore, the fraction $b^m \Phi(i) - j$ may be computed by removing the m least significant digits of the index i. In another embodiment, as the resulting term $\Phi(\lfloor i/b^m \rfloor)$ no longer does depend on j, it may be factored out of the sum. In another embodiment, the remaining sum of characteristic functions may always be one, because the whole unit interval may be covered and $$\Phi(i) \in [0, 1) = \bigcup_{j=0}^{b^m-1} \left[\frac{j}{b^m}, \frac{j+1}{b^m}\right).$$

Further, as shown in operation 204, a low discrepancy sequence to be used in association with the measurement contribution algorithm is determined, where the low discrepancy sequence includes at least one component that is a (0,1)-sequence in base b. For example, instead of sampling by using uniform random or pseudo-random numbers, quasi-Monte Carlo methods may apply deterministic low discrepancy sequences, which may be more uniformly distributed than random numbers can be.

Further still, the algorithm shown in Table 3 may work with any quadrature, and may require the structure of a (0, 1)-sequence. Since each component of the Halton sequence is a (0, 1)-sequence, the proof may apply. As scrambling does not affect the stratification properties of (0, 1)-sequences, scrambled sequences may be used. Rank-1 lattice sequences may expose a similar structure and may be used as well. See, for example, "Extensible lattice sequences for quasi-Monte Carlo quadrature," (F. Hickernell et al., SIAM J. Sci. Comput., 22 (2001), 1117-1138), and which is hereby incorporated by reference in its entirety.

Also, in one embodiment, integro-approximation may be performed. For example, integro-approximation may be performed by adding the parameter y to the algorithm shown in Table 3. Table 5 illustrates an application of the parameter y to an algorithm for a quasi-Monte Carlo integration, in accordance with one embodiment. Of course, it should be noted that the exemplary application shown in Table 5 is set forth for illustrative purposes only, and thus should not be construed as limiting in any manner.

TABLE 5

$$\lim_{n \to \infty} \frac{1}{n} \sum_{i=0}^{n-1} f(\vec{x}_i, t_{\lfloor i/b^m \rfloor}, y) = \int_{[0,1)^s} f(\vec{x}_i, t, y) dt dx = g(y).$$

In addition, in one embodiment, quasi-Monte Carlo integration may be performed in multiple dimensions. Table 6 illustrates an application of the algorithm shown in Table 3 to multiple variables and at multiple rates $b_k^{m_k}$, in accordance with one embodiment. Of course, it should be noted that the exemplary application shown in Table 6 is set forth for illustrative purposes only, and thus should not be construed as limiting in any manner.

TABLE 6

$$\int_{[0,1]^s} f(\vec{x}, t_1, t_2) dt_1 dt_2 dx = \int_{[0,1]^s} \sum_{j_2=0}^{b_2^{m_2}-1} \chi_{\left[\frac{j_2}{b_2^{m_2}}, \frac{j_2+1}{b_2^{m_2}}\right)}(t_2)$$

$$\sum_{j_1=0}^{b_1^{m_1}-1} \chi_{\left[\frac{j_1}{b_1^{m_1}}, \frac{j_1+1}{b_1^{m_1}}\right)}(t_1) f(\vec{x}, b_1^{m_1} t_1 - j_1, b_2^{m_2} t_2 - j_2) dt_1 dt_2 dx$$

$$= \lim_{n \to \infty} \frac{1}{n} \sum_{i=0}^{n-1} \sum_{j_2=0}^{b_2^{m_2}-1} \chi_{\left[\frac{j_2}{b_2^{m_2}}, \frac{j_2+1}{b_2^{m_2}}\right)}(t_2) \sum_{j_1=0}^{b_1^{m_1}-1} \chi_{\left[\frac{j_1}{b_1^{m_1}}, \frac{j_1+1}{b_1^{m_1}}\right)}(t_1) f(\vec{x}, b_1^{m_1} t_1 - j_1, b_2^{m_2} t_2 - j_2)$$

$$= \lim_{n \to \infty} \frac{1}{n} \sum_{i=0}^{n-1} \sum_{j_2=0}^{b_2^{m_2}-1} \chi_{\left[\frac{j_2}{b_2^{m_2}}, \frac{j_2+1}{b_2^{m_2}}\right)}(t_2) f\left(\vec{x}, t_{1,\lfloor i/b_1^{m_1}\rfloor}, b_2^{m_2} t_2 - j_2\right)$$

$$= \lim_{n \to \infty} \frac{1}{n} \sum_{i=0}^{n-1} f\left(\vec{x}, t_{1,\lfloor i/b_1^{m_1}\rfloor}, t_{2,\lfloor i/b_2^{m_2}\rfloor}\right)$$

Further, as shown in operation 206, the low discrepancy sequence is enumerated to yield a plurality of points, where the at least one component that is a (0,1)-sequence in base b is enumerated by a power of b slower than at least one of the remaining components.

Further still, in one embodiment, the algorithm shown in Table 3 may increase an efficiency of Monte Carlo and quasi-Monte Carlo integration. In another embodiment, samples of the Sobol' sequence may be enumerated per pixel. This may be based on the fact that the first two dimensions of the Sobol' sequence form a (0, 2)-sequence and as such a sequence of (0, m, 2)-nets. As a result, each (0, 2m, 2)-net may have exactly one sample in a regular $2^m \times 2^m$ grid. In another embodiment, m may be selected such that the grid is at least as large as the array of pixels. Then the samples may be efficiently enumerated per pixel. See, for example, "Enumerating quasi-Monte Carlo point sequences in elementary intervals," (Grünschloβ et al., Monte Carlo and Quasi-Monte Carlo Methods 2010, 2012, 1992, pages 379-388), which is hereby incorporated by reference in its entirety.

Also, in one embodiment, for sampling time, the algorithm shown in Table 3 may be directly applied. For example, the time per each set of $2^m \times 2^m$ light transport path samples may be computed as $t_{\lfloor i/2^{2m} \rfloor}$ and such may be constant over one frame. This may have the advantage that the acceleration data structure may be static for one frame to be accumulated. In addition, no approximation may be required; the modeling system may only be required to provide access to the scene data at a given time $t_{\lfloor i/2^{2m} \rfloor}$.

In another embodiment, the algorithmic principle as depicted in Table 6 may be applied using a Halton sequence, whose samples may as well be efficiently enumerated per pixel.

Additionally, as shown in operation 208, the measurement contribution algorithm is evaluated, utilizing the plurality of points yielded by the enumeration of the low discrepancy sequence. In one embodiment, data locality may be increased for two or more applications. In another embodiment, memory traffic may be reduced, when motion is approximated using motion segments, for example by linear splines. For instance, if $b^m$ is larger or equal to the maximum number of motion segments, then the time $t_{\lfloor i/b^m \rfloor}$ may select the same segment in each spline for each block of $b^m$ samples. In this way. If $2^m \times 2^m$ is larger or equal to the maximum number of motion segments, then the same motion segments may be used all over the frame. In another embodiment, the actual time for interpolating a motion segment may be $t_i$.

Furthermore, in one embodiment, spectral rendering may be performed. For example, in simulation measured spectral data sets may be used as they allow for a maximum degree of realism. Such data sets may be large as they sample at least three more dimensions aside from wavelength: an isotropic bidirectional reflectance distribution function may already have three parameters. In another embodiment, Applying the algorithm shown in Table 3 to wavelength sampling may allow for keeping the wavelength constant for a block of $b^m$ samples, which in turn may require to only load data for that specific wavelength. This may also be combined with motion blur sampling.

Further still, in one embodiment, coherent Russian roulette absorption may be performed. For example, the application of the algorithm shown in Table 3 may be used to reduce divergence when simultaneously tracing multiple trajectories using Russian roulette absorption. For instance, each vector of a low discrepancy sequence may determine a light transport path. If now the value $t_{j,\lfloor i/b_j^{m_j} \rfloor}$ is used for the components j that simulate Russian roulette absorption, a contiguous block of $b^m$ paths may use this same value. This may increase the chance that either all or none of the paths are terminated.

In this way, forward path tracing performance may be improved. Additionally, the speedup may come with higher variation of computation time per block, since as path length is decided in a more coherent way, all paths of a block may be either longer or shorter.

The algorithm shown in Table 3 and its generalization to multiple dimensions as shown in Table 6 may be applied to increase the efficiency of sampling light sources. In contrast to classic trajectory splitting using random or pseudo-random sampling, deterministic samples of low discrepancy may be used to sample the light sources a power of b more times. In one exemplary embodiment, each end point of a path traced from a simulated camera is connected to a power of b more paths traced from the light sources. In another embodiment, each end point of a path traced from a simulated camera is connected to a power of b more samples in an at least one of an environment map or samples generated on the surface of a light source. Note that the embodiments are set forth for illustrative purpose only and should not be construed in any limiting manner.

When rendering animations, the simulation of motion blur may be important in order to reduce the disturbing artifacts resulting from just playing back still images. Additionally, motion blur may result from integrating over the shutter interval. The aforementioned developments may provide an efficient, deterministic, and consistent approach to motion blur simulation based on quasi-Monte Carlo integration that may be integrated in light transport simulation and may converge unconditionally to the true solution without introducing any persistent rendering artifacts.

Figure 4:
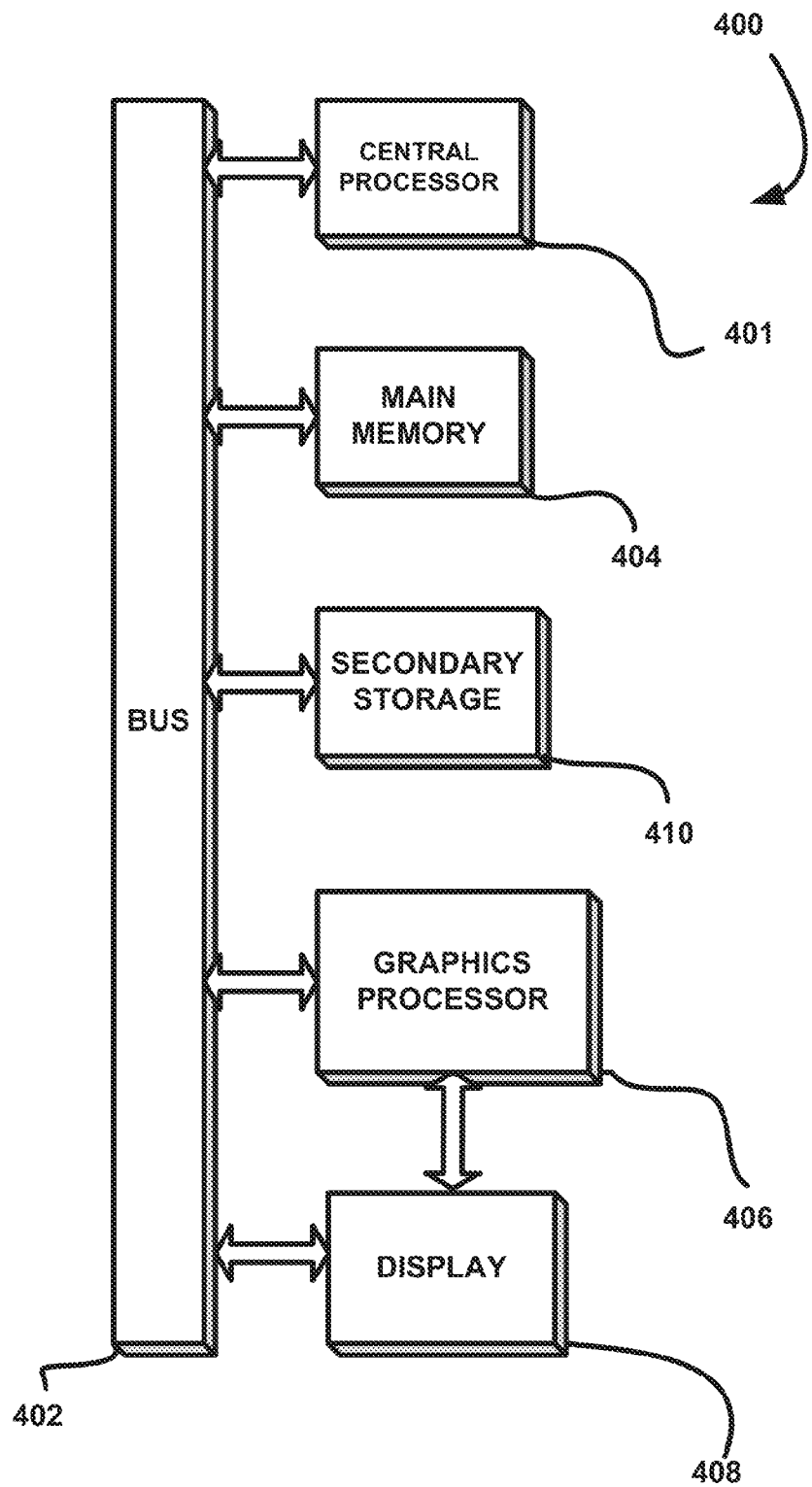
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying an image to be rendered;
determining a low discrepancy sequence associated with the image that includes at least one component that is a (0,1)-sequence in base b, utilizing a hardware processor; and
computing motion blur in association with the rendering of the image, utilizing the at least one component that is the (0,1)-sequence in base b included within the low discrepancy sequence.

2. The method of claim 1, wherein the low discrepancy sequence includes a plurality of vectors.

3. The method of claim 1, wherein the low discrepancy sequence includes a sequence $(x_i, y_i)$, where $x_i$ represents dimensions of a sink path segment, and $y_i$ represents dimensions of a source path segment.

4. The method of claim 1, wherein the low discrepancy sequence includes a (t,s)-sequence in base b.

5. The method of claim 1, wherein the low discrepancy sequence includes a rank-1 lattice sequence.

6. The method of claim 1, wherein the low discrepancy sequence includes a Halton sequence.

7. The method of claim 1, wherein the low discrepancy sequence includes a hybrid sequence.

8. The method of claim 1, wherein evaluating the integral includes enumerating the low discrepancy sequence to create a plurality of points in the low discrepancy sequence.

9. The method of claim 1, wherein enumerating the low discrepancy sequence includes enumerating the at least one (0,1)-sequence in base b by a factor of a power of b that is slower than at least one of the components of the low discrepancy sequence other than that (0,1)-sequence in base b.

10. The method of claim 8, wherein the integral is evaluated utilizing the plurality of points created by enumerating the low discrepancy sequence.

11. The method of claim 1, wherein the low discrepancy sequence is used in association with a measurement contribution algorithm.

12. The method of claim 1, wherein multiple components of the low discrepancy sequence are (0,1)-sequences each in a base b, and each one of the multiple components is enumerated by a factor of a power of its b slower than at least one of the other components of the low discrepancy sequence, such that integro-approximation is performed, utilizing the low discrepancy sequence.

13. The method of claim 1, wherein the at least one component that is the (0,1)-sequence in base b is used to compute the motion blur in image synthesis using motion segments.

14. The method of claim 1, wherein the at least one component that is a (0,1)-sequence in base b is used to perform spectral simulation by selecting a wavelength.

15. The method of claim 1, wherein the at least one component that is a (0,1)-sequence in base b is used to simulate path termination using a Russian Roulette methodology.

16. The method of claim 1, wherein the at least one component that is a (0,1)-sequence in base b is used to select and sample light sources for illumination computation.

17. A computer program product embodied on a non-transitory computer readable medium, comprising code for:
  identifying an image to be rendered;
  determining a low discrepancy sequence associated with the image that includes at least one component that is a (0,1)-sequence in base b, utilizing a hardware processor; and
  computing motion blur in association with the rendering of the image, utilizing the at least one component that is the (0,1)-sequence in base b included within the low discrepancy sequence.

18. A system, comprising:
  a processor that:
    identifies an image to be rendered;
    determines a low discrepancy sequence associated with the image that includes at least one component that is a (0,1)-sequence in base b, utilizing a hardware processor; and
    computes motion blur in association with the rendering of the image, utilizing the at least one component that is the (0,1)-sequence in base b included within the low discrepancy sequence.

19. The system of claim 18, wherein the system is implemented on a reconfigurable device.

20. The system of claim 19, wherein the reconfigurable device includes a field-programmable gate array (FPGA).

* * * * *